(12) United States Patent
Bitzer et al.

(10) Patent No.: US 6,678,935 B2
(45) Date of Patent: Jan. 20, 2004

(54) METHOD FOR REMOVING THE CORROSION PROTECTIVE COATING

(75) Inventors: Rita Bitzer, Boeblingen (DE); Half Passoth, Starzach (DE)

(73) Assignee: DaimlerChrysler AG, Stuttgart (DE)

( * ) Notice: Subject to any disclaimer, the term of this patent is extended or adjusted under 35 U.S.C. 154(b) by 108 days.

(21) Appl. No.: 09/971,504

(22) Filed: Oct. 5, 2001

(65) Prior Publication Data

US 2002/0040658 A1 Apr. 11, 2002

(30) Foreign Application Priority Data

Oct. 6, 2000 (DE) .......................... 100 49 456

(51) Int. Cl.[7] .......................... B23P 25/00; B23P 13/04; B23P 11/00
(52) U.S. Cl. .......................... 29/458; 29/527.2; 29/428
(58) Field of Search .......................... 29/458, 527.2, 29/428; 106/14.12; 427/335

(56) References Cited

U.S. PATENT DOCUMENTS 4,321,175 A * 3/1982 Schmidt et al. ............. 524/555
5,569,543 A    10/1996 Schaffer, Jr. et al.
5,972,090 A    10/1999 Hörth

FOREIGN PATENT DOCUMENTS

| EP | 0 976 795 | 2/2000 |
| WO | 95/15445 | 6/1995 |
| WO | WO9840641 | * 9/1998 |

OTHER PUBLICATIONS

Database WPI, Section Ch, Week 197709, Derwent Publications Ltd., London, GB; Class M13, AN 1977–15170Y, XP–002192143.

* cited by examiner

Primary Examiner—John C. Hong
(74) Attorney, Agent, or Firm—Kenyon & Kenyon

(57) ABSTRACT

A corrosion protective lacquer is for producing a corrosion protective coating, and a method is for removing the corrosion protective coating. For a more favorable removal, while maintaining simultaneous corrosion protection, the corrosion protective lacquer, and thus also the corrosion protective coating produced from it, includes protective substances that react with oxygen. The corrosion protective coating is abraded by the abrasive effect of the brake linings during braking, the protective substances of the corrosion protective coating being rubbed into the braking surface.

12 Claims, 1 Drawing Sheet

US 6,678,935 B2

METHOD FOR REMOVING THE CORROSION PROTECTIVE COATING

FIELD OF THE INVENTION

The present invention relates to a corrosion protective lacquer for braking surfaces of brake disks and/or brake drums, a corrosion protective coating made thereof, and a method for removing the corrosion protective coating as it is used in the shop of the applicant.

BACKGROUND INFORMATION

For protection from corrosion, a brake disk and/or brake drum is generally lacquered. For this a lacquer is used which can be removed by braking, that is, removed by the abrasive action of the brake pad in the area of the braking surface. This solution has proven particularly favorable in vehicles designated for overseas transportation and with replacement brake disks or drums.

Despite the advantages of convention methods, braking surfaces of brake disks or braking surfaces treated with it still demonstrate sensitivities during transportation, especially because of the aggressive salt air during overseas transportation. High quality assurance costs and partial reworks are connected with this.

It is an object of the present invention to provide a corrosion protective lacquer with which a corrosion protective coating may be produced which makes possible a corrosion protection even in overseas transportation, less rework and cost reduction, and which may be removed as simply as possible.

SUMMARY

The above and other beneficial objects of the present invention are achieved by providing a corrosion protective lacquer, a corrosion protective coating and a method as described herein. Access of oxygen to the braking surface is prevented by covering at least the braking surfaces with a corrosion protective lacquer according to the present invention having a high proportion of protective substances that react with oxygen.

In order to achieve the desired effect, a protective substance proportion of at least 30% by volume, for example, at least 50% by volume or at least 70% by volume, is practical in the lacquer or clearcoat that is otherwise, for example, of customary type.

These protective substances may include, for example, non-alkaline and non-earth alkaline metals such as, for example, zinc, elemental aluminum or their oxidizable compounds, such as, for example, FeO. Additionally, phosphorus and/or phosphates are also suitable.

During removal by braking, the substances are, at least partially, for example, pressed and/or rubbed into the surface of the braking surface, where they remain and further effect protection of the metallic surface from oxidation. This removal by braking may be performed at any time, for example, however, before delivery of an automobile to a customer, such as on a roller test stand. Because one obtains corrosion protective action even after the removal of the corrosion protective coating by braking, the removal of the corrosion protective coating may be performed, for example, before mounting the brake disk, shortly after its manufacture, so that only a brake disk is mounted that is ready and protected from corrosion.

By the introduction of the protective substances into the surface rough spots, pores and score marks of the braking surface, the normal surface roughness of the braking surfaces, which results due to the natural pores of the brake disk material and/or grinding or turning score marks, is reduced at the same time. The result is a lesser depth of corrosion, whereby in turn the probability of brake judder is lessened at the same time.

In order to achieve a particularly satisfactory result, the average particle size of the protective substances may be smaller than the maximum roughness and/or the average pore width and/or the average score mark size of the braking surface.

A metal lacquer having a zinc dust proportion of approximately 80% by volume may be a cost-effective solution.

DETAILED DESCRIPTION

Figure 1:
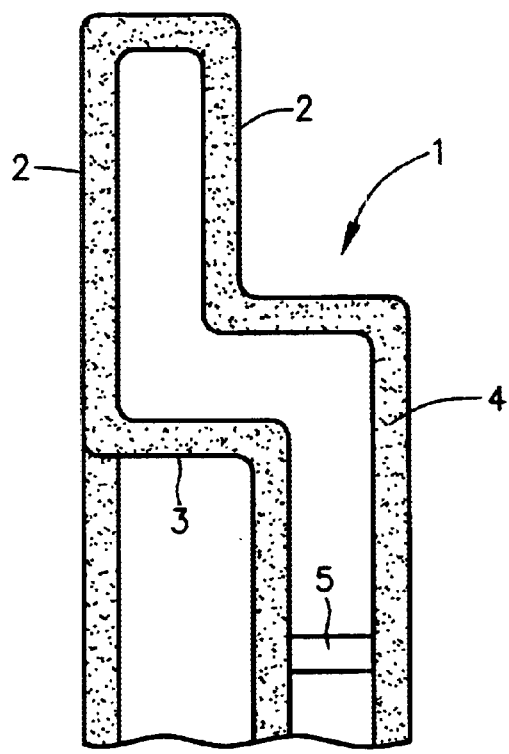
FIG. 1 is a cross-sectional view of a brake disk having a combined brake drum and a corrosion protective lacquer applied thereto.

FIG. 1 is a cross-sectional view of a brake disk 1 having a combined brake drum. The whole surface of brake disk 1 is provided with a corrosion protective lacquer 4. Since the corrosion protective lacquer may be identical to a conventional lacquer except for protective substances 10 (illustrated as individual dots), it is possible to apply it to the surface of brake disk 1 using a normal spraying and/or dipping method.

Figure 2:
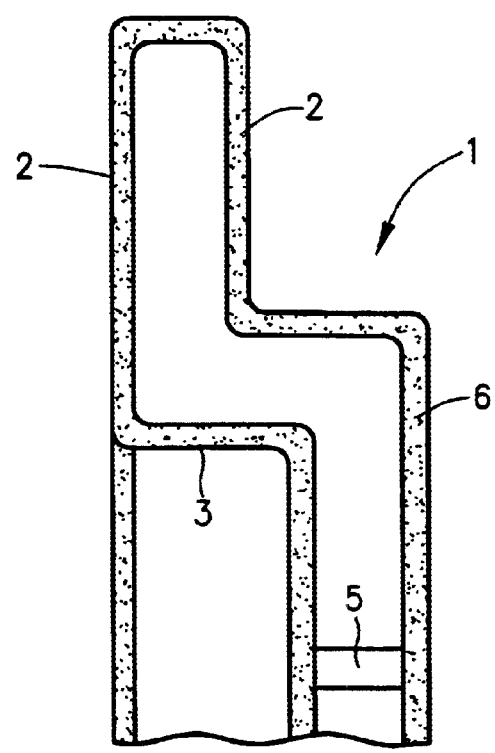
FIG. 2 is a cross-sectional view of the brake disk illustrated in FIG. 1 having the corrosion protective lacquer solidified to a corrosion protective coating.

After application, corrosion protective lacquer 4 is dried or allowed to set or cured into corrosion protective coating 6 (see FIG. 2). Since during curing of the corrosion protective lacquer the solvent, for example, water, escapes from coating 6, the proportion of the protective substances 10 in corrosion protective coating 6 increases as compared to their proportion in corrosion protective lacquer 4. As illustrated in FIG. 2, this may be seen in the greater density of the points and coating 6.

Due to the high proportion of protective substances 10 of, for example, more than 70% by volume, even a deep crack may not endanger braking surface 2 of the brake disk and/or braking surface 3 of the brake drum through corrosion, since the oxygen is intercepted by protective substances 10, whereby they themselves react in the form of an oxidation.

Figure 3:
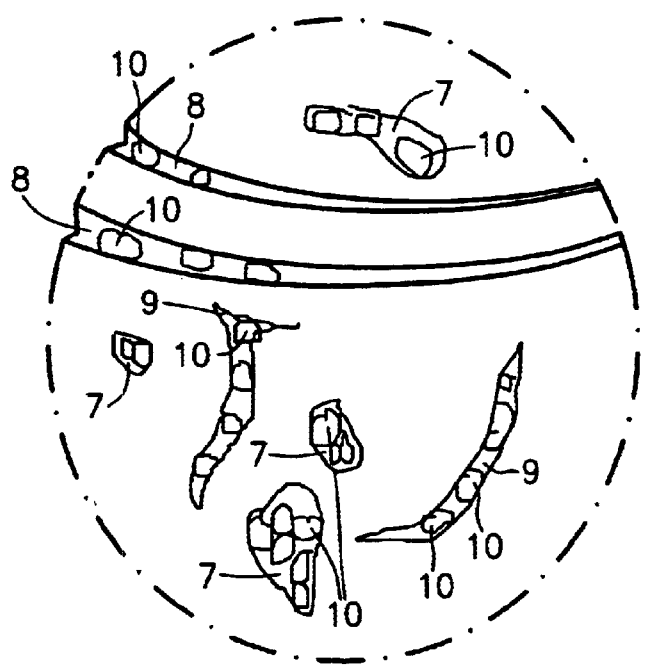
FIG. 3 is a magnified view of a braking surface after removal of the corrosion protective coating.

FIG. 3 is a magnified view of braking surface 2, 3 after removal of corrosion protective layer 6 by braking. It may be seen that protective substances 10 have been inserted into pores 7 and score marks 8 or other recesses 9.

This arrangement reduces the normal roughness of braking surface 2 and, along with that, the corrosion depth to be expected. Furthermore, at least initially, the rust attack in a vehicle standing still for a long time is reduced, since in this case, corrosion protection by self-oxidation of protective substances 10 remains in effect. That is, the inserted protective substances 10 act as a sacrificial anode.

What is claimed is:

1. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating; and abrading the corrosion protective coating by an abrasive effect of a brake lining during braking, the abrading step including the substep of rubbing the protective substance into the braking surface;

wherein the converting step includes the substep of hardening the corrosion protective lacquer.

2. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating; and abrading the corrosion protective coating by an abrasive effect of a brake lining during braking, the abrading step including the substep of rubbing the protective substance into the braking surface;

wherein the rubbing substep includes the substep of rubbing the protective substance into at least one of recesses, rough areas, pores and grooves of a friction surface of the brake disk.

3. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating; and abrading the corrosion protective coating by an abrasive effect of a brake lining during braking, the abrading step including the substep of rubbing the protective substance into the braking surface;

wherein the protective substance includes at least one of a non-alkaline metal, a non-earth alkaline metal, an oxidizable metal compound, phosphate and phosphorous.

4. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating; and abrading the corrosion protective coating by an abrasive effect of a brake lining during braking, the abrading step including the substep of rubbing the protective substance into the braking surface;

wherein the protective substance has an average grain size substantially equal to at least one of a maximum roughness, an average pore diameter and an average score mark size of the braking surface.

5. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating;

abrading the corrosion protective coating by an abrasive effect of a brake lining during braking, the abrading step including the substep of rubbing the protective substance into the braking surface; and delivering the brake disk to a customer after the abrading step.

6. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating;

abrading the corrosion protective coating by an abrasive effect of a brake lining during braking, the abrading step including the substep of rubbing the protective substance into the braking surface; and equipping a vehicle with the brake disk after the abrading step.

7. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating;

abrading the corrosion protective coating by an abrasive effect of a brake lining during braking, the abrading step including the substep of rubbing the protective substance into the braking surface; and mounting the at least one of a brake disk and a brake drum on a vehicle before the abrading step.

8. A method for removing a corrosion protective coating from a braking surface of at least one of a brake disk and a brake drum, comprising the steps of:

adding a protective substance to a corrosion protective lacquer, the protective substance being configured to at least one of chemically react with oxygen in response to contact with oxygen and bind with oxygen in response to contact with oxygen;

applying the corrosion protective lacquer to the braking surface after the adding step;

converting the corrosion protective lacquer to form the corrosion protective coating;

abrading the corrosion protective coating by an abrasive effect of a brake lining during braking, the abrading step including the substep of rubbing the protective substance into the braking surface; and mounting the at least one of a brake disk and a brake drum on a vehicle after the abrading step.

9. A method for protecting from corrosion a braking surface of at least one of a brake disk and a brake drum, comprising the steps of:

applying a corrosion protective lacquer to the braking surface, said protective lacquer including a protective substance configured to at least one of chemically react with oxygen in response to contact with oxygen and bind with oxygen in response to contact with oxygen.

10. The method according to claim 9, further comprising the step of converting the corrosion protective lacquer to form a corrosion protective coating.

11. The method according to claim 10, further comprising the step of abrading the corrosion protective coating by an abrasive effect of a brake lining during braking.

12. The method according to claim 11, wherein the abrading step includes the substep of rubbing the protective substance into the braking surface.

* * * * *

UNITED STATES PATENT AND TRADEMARK OFFICE
CERTIFICATE OF CORRECTION

PATENT NO. : 6,678,935 B2  Page 1 of 1
DATED : January 20, 2004
INVENTOR(S) : Bitzer et al.

It is certified that error appears in the above-identified patent and that said Letters Patent is hereby corrected as shown below:

Title page,
Item [54], Title, should read:
-- CORROSION PROTECTIVE LACQUER FOR BRAKING SURFACES OF BRAKE DISKS AND/OR BRAKE DRUMS, CORROSION PROTECTIVE COATING PRODUCED THEREFROM, AND A METHOD FOR REMOVING THE CORROSION PROTECTIVE COATING --

Signed and Sealed this

Fifth Day of April, 2005

JON W. DUDAS
*Director of the United States Patent and Trademark Office*